United States Patent [19]

Samuels et al.

[11] Patent Number: 4,937,770
[45] Date of Patent: Jun. 26, 1990

[54] SIMULATION SYSTEM

[75] Inventors: Michael W. Samuels, San Jose; John J. Zasio, Sunnyvale, both of Calif.

[73] Assignee: Teradyne, Inc., Boston, Mass.

[21] Appl. No.: 292,620

[22] Filed: Dec. 29, 1988

Related U.S. Application Data

[63] Continuation of Ser. No. 854,554, Feb. 7, 1986, abandoned, which is a continuation of Ser. No. 826,927, Feb. 7, 1986, abandoned.

[51] Int. Cl.⁵ .......................... G06G 7/48; G11C 7/00
[52] U.S. Cl. .................................... 364/578; 364/900; 364/490; 371/23; 365/189.05; 365/230.08
[58] Field of Search ................ 364/488, 489, 490, 491, 364/578, 512, 200, 900, 716; 371/23; 365/230.4, 230.8, 189.01, 189.05; 307/272.2

[56] References Cited

U.S. PATENT DOCUMENTS

| | | | |
|---|---|---|---|
| 2,488,740 | 11/1949 | Robert | 171/97 |
| 3,551,891 | 12/1970 | Hermes et al. | 340/172.5 |
| 3,702,003 | 10/1972 | Ramirez, Jr. et al. | 444/1 |
| 3,934,231 | 1/1976 | Armstrong | 364/900 |
| 3,961,250 | 6/1976 | Snethen | 371/23 |
| 4,017,840 | 4/1977 | Schild et al. | 364/900 |
| 4,051,353 | 9/1977 | Lee | 364/900 X |
| 4,055,851 | 10/1977 | Jenkins | 364/900 X |
| 4,140,921 | 2/1979 | Balasubramanian et al. | 307/208 |
| 4,236,203 | 11/1980 | Curley et al. | 264/200 |
| 4,293,919 | 10/1981 | Dasgupta et al. | 364/716 |
| 4,306,286 | 12/1981 | Cocke et al. | 364/485 |
| 4,365,334 | 12/1982 | Smith et al. | 371/27 |
| 4,404,635 | 9/1983 | Flaker | 364/481 |
| 4,424,581 | 1/1984 | Kawai | 307/272.2 |
| 4,428,060 | 1/1984 | Blum | 364/715 |
| 4,445,172 | 4/1984 | Peters et al. | 364/200 |
| 4,450,560 | 5/1984 | Conner | 371/25 |
| 4,451,880 | 5/1984 | Johnson et al. | 364/200 |
| 4,472,804 | 9/1984 | Fullwood et al. | 371/23 |
| 4,482,953 | 11/1984 | Burke | 364/200 |
| 4,527,249 | 7/1985 | Van Brunt | 364/578 |
| 4,541,071 | 9/1985 | Ohmori | 364/900 |
| 4,584,642 | 4/1986 | Fudanuki | 364/200 |
| 4,590,581 | 5/1986 | Widdoes, Jr. | 364/578 |
| 4,628,471 | 12/1986 | Schuler et al. | 364/578 |
| 4,663,741 | 5/1987 | Reinschmidt et al. | 365/230.08 X |
| 4,725,975 | 2/1988 | Sasaki | 364/491 X |
| 4,736,338 | 4/1988 | Saxe et al. | 364/578 X |
| 4,744,084 | 5/1988 | Beck et al. | 364/578 X |
| 4,755,933 | 7/1988 | Teshima et al. | 364/200 |
| 4,782,440 | 11/1988 | Nomizu et al. | 364/900 X |
| 4,825,416 | 4/1989 | Tam et al. | 365/189.05 X |
| 4,845,667 | 7/1989 | Höptner et al. | 364/900 |
| 4,849,937 | 7/1989 | Yoshimoto | 365/189.05 |

FOREIGN PATENT DOCUMENTS

| | | | |
|---|---|---|---|
| 0099114 | 1/1984 | European Pat. Off. | |
| 2568698 | 2/1986 | France | 364/578 |
| 0134390 | 10/1981 | Japan | 365/189.05 |

OTHER PUBLICATIONS

Hwang, Kai et al., *Computer Architecture and Parallel Processing*, McGraw-Hill, 1984, pp. 145-154, 164-170.
Barto et al., "A Computer Architecture for Digital Logic Simulation", *Electronic Engineering*, Sep. 1980, vol. 52, No. 643, pp. 35-66.
Lineback, J. Robert, "Logic Simulation Speeded with Special Hardware", *Electronics Review*, Jun. 16, 1982, vol. 55, No. 12, pp. 45-46.
Agnus R. McKay, "Comment on Computer-Aided Design Simulation of Digital Design Logic", IEEE Transactions on Computers, Sec. 1969, p. 862.

*Primary Examiner*—Parshotam S. Lall
*Assistant Examiner*—Joseph L. Dixon
*Attorney, Agent, or Firm*—Albert C. Smith

[57] ABSTRACT

A levelized simulation system includes a means for storing a model of a logic system to be simulated. The logic system has a plurality of levels of logic which are synchronously clocked. A processing system including an arithmetic logic unit sequentially tests each element of said logic system, one level of logic at a time, thus each logic element in the first level is tested with the results there stored in a state memory, after which the logic elements of the second level of the logic system are tested and so on. During each test a comparison is made to determine whether there is a defect in the logic design.

14 Claims, 6 Drawing Sheets

TRUTH TABLE FOR SIMULATOR ALU

| OPERANDS | | INSTRUCTIONS | | | | | | | | | | | |
|---|---|---|---|---|---|---|---|---|---|---|---|---|---|
| B = ACC | | | | | | | | | | | | | |
| A | B | AND | NAND | OR | NOR | XOR | XNOR | TRI | TXX | DOT | LA | CO | WD |
| 0 | 0 | 0 | 1 | 0 | 1 | 0 | 1 | Z | Z | 0 | 0 | 1 | 0 |
| 0 | 1 | 0 | 1 | 1 | 0 | 1 | 0 | Z | Z | X | 0 | 0 | 1 |
| 0 | X | 0 | 1 | X | X | X | X | Z | Z | X | 0 | 1 | X |
| 0 | Z | 0 | 1 | X | X | X | X | Z | Z | 0 | 0 | 0 | 0 |
| 1 | 0 | 0 | 1 | 1 | 0 | 1 | 0 | 0 | 0 | X | 1 | 0 | 0 |
| 1 | 1 | 1 | 0 | 1 | 0 | 0 | 1 | 1 | 1 | 1 | 1 | 1 | 1 |
| 1 | X | X | X | 1 | 0 | X | X | X | X | X | 1 | 1 | X |
| 1 | Z | X | X | 1 | 0 | X | X | X | Z | 1 | 1 | 0 | 1 |
| X | 0 | 0 | 1 | X | X | X | X | X | X | X | X | 0 | 0 |
| X | 1 | X | X | 1 | 0 | X | X | X | X | X | X | 0 | 1 |
| X | X | X | X | X | X | X | X | X | X | X | X | 1 | X |
| X | Z | X | X | X | X | X | X | X | X | X | X | 0 | X |
| Z | 0 | 0 | 1 | X | X | X | X | X | X | 0 | Z | 0 | 0 |
| Z | 1 | X | X | 1 | 0 | X | X | X | X | 1 | Z | 0 | 1 |
| Z | X | X | X | X | X | X | X | X | X | X | Z | 1 | X |
| Z | Z | X | X | X | X | X | X | X | X | Z | Z | 1 | Z |

Figure 6

SIMULATION SYSTEM

RELATED APPLICATIONS

This is a continuation of co-pending application Ser. No. 854,554 filed on Feb. 7, 1986 which is a continuation of application Ser. No. 826,927 filed on Feb. 7, 1986 now abandoned.

BACKGROUND OF THE INVENTION

The present invention relates to a system for testing digital logic systems.

Digital logic simulation is a technique utilized to verify and debug a logic system which is designed before it is fabricated. Simulation techniques are also utilized to experiment with a given design so that appropriate design modifications and choices can be made without the expense of actually constructing the design. In the past computer software has been used to simulate many types of designs but at a performance speed which is many orders of magnitude lower than real time operation. The speed of such software simulations systems can be increased by providing a hybrid software/hardware system. An example of one such simulator is that used to simulate the operation of an aircraft.

Digital logic systems have traditionally been simulated in software at the subsystem level but not at the system level except when the cost of a mistake in the final system cannot be tolerated. In many cases, digital logic which is to be fabricated on a LSI or VLSI chip has been prefabricated using discrete components or other small scale integrated devices in order to test the design. For example, in the past, SSI chips have been mounted on PC boards in place of each of the LSI chips contemplated for a final computer design. A model of the computer would be built with these PC boards and used to debug the design. Such a simulation technique is time consuming, expensive and itself generates defects not normally found in an LSI or VLSI chip.

More recently, the algorithms used by the software simulators have been implemented in hardware which can operate one or two orders of magnitude faster and cost one or two orders of magnitude less than software techniques. Examples of such systems are disclosed in Blum (U.S. Pat. No. 4,428,060) and Von Brunt (U.S. Pat. No. 4,527,249).

Conventional simulation techniques are typically called event driven simulators. As exemplified by that illustrated in the Blum '060 patent each gate is simulated that has an input change. The propagation times through the gate are also monitored. If a gate changes state, this causes a new event to occur. The simulator must maintain a list of events and flag the gates driven by these events for evaluation. An event driven simulator can simulate both event driven, i.e., nonsynchronous, and synchronous logic designs. In most digital systems, only about 20% of the gates change state in any given clock cycle and accordingly an event driven simulator does not have to simulate all of the gates at each interval time.

In a synchronous design with level sensitive logic, there are no feedback loops or so-called race conditions such that the difference in path delay may cause a pulse which can be used as an event for causing further switching to occur. Thus in a synchronous system, at each clock cycle, data is transmitted from latches to the logic gate connected directly to the latches. These gates may switch causing new inputs to the next gate in the path which may also switch resulting in an orderly propagation of data to the input of the next set of latches. This logic can be simulated by first evaluating all the gates with inputs connected only to the output of the latches. Then the gates one logic level away from the latches are evaluated, then two levels away, and so on until all the logic is evaluated.

Instructions to simulate this logic can be placed in a sequence determined by the level of the logic gate in the data path. In this sequence, one pass of the instructions will evaluate all of the gates and determine the inputs to the next latches. No decision must be made to evaluate a gate and no status table need be maintained. Accordingly the instructions can be executed in a "pipeline" sequence with no branches. When all the gates have been evaluated, the inputs to the latches are stored in memory locations associated with the master portion of the latches. This data is then transferred to memory locations associated with the slave portion of the latches to simulate the action of the master clock. Thus, only one pass through of the instructions and one exchange of master/slave data simulates one clock cycle of the synchronous design.

This levelized form of simulation requires less than eight computer instructions to simulate each gate. Thus, in a one MIP computer this results in a simulation rate of 120,000 gates per second. Even though the levelized simulator is evaluating every gate per system cycle compared to the typical 20% evaluation for an event driven simulator, it is still ten times faster than the event driven simulator.

It accordingly is an object of the present invention to provide an improved logic simulation system.

SHORT STATEMENT OF THE INVENTION

Accordingly, the present invention relates to a logic simulation system which broadly includes a means for storing a model of a logic system to be simulated. The logic system has a plurality of levels of logic which are synchronously clocked. Means including an arithmetic logic unit sequentially test each element of said logic system one level of logic at a time. Thus, each logic element in the first level is tested with the results thereof stored in a state memory after which the logic elements of the second level of the logic system are tested and so on. During each test a comparison is made to determine whether there is a defect in the logic design.

BRIEF DESCRIPTION OF THE DRAWINGS

Other objects, features and advantages of the present invention will become more fully apparent from the following detailed description of the preferred embodiment, the appended claims and the accompanying drawings in which:

FIG. 6 is an illustration of the truth table for the arithmetic logic unit of the execution unit of the preferred embodiment of the present invention.

DETAILED DESCRIPTION OF THE PREFERRED EMBODIMENT

Figure 1:
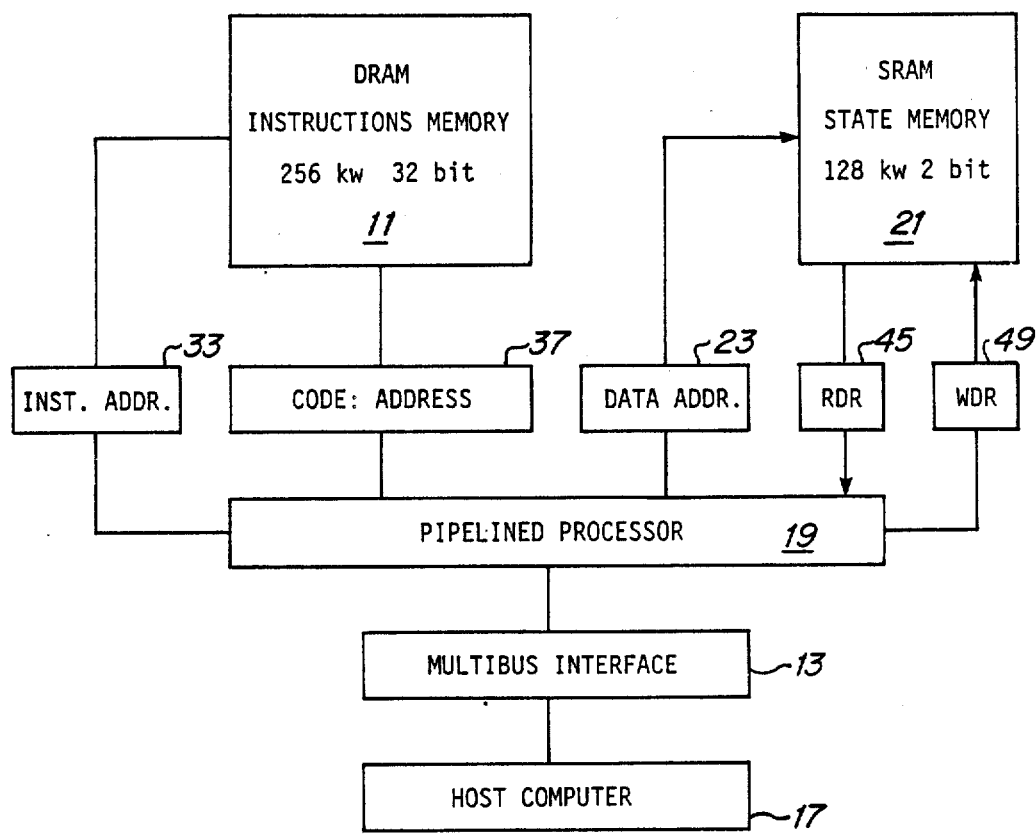
FIG. 1 is a functional block diagram of the preferred embodiment of the present invention.

Refer now to the figures where like numerals represent like elements throughout the figures. In FIG. 1, there shown a simplified functional block diagram of the levelized simulator of the preferred embodiment of the present invention. The simulator includes a large instruction memory 11 in the form of a dynamic random access memory (DRAM) which is capable of storing at least 250,000 words each having 32 bits. This instruction memory 11 is loaded by the Multibus interface 13 via an instruction and address register 33. The instructions are levelized instructions to simulate the logic to be tested. Once loaded, instruction memory 11 is used as a sequential access read only memory during simulation. Because the instructions are put in a sequence to simulate the levelized logic, one pass through of the instructions will execute one clock cycle of the logic design being simulated. Because the instruction memory 11 is accessed in a sequential manner with no branches, it must have a high bandwidth memory although the access time is not critical. Column ripple mode CMOS dynamic RAMs have this feature and also have a large capacity. These memories have a 512 bit static register which is loaded when the row address is presented to the chip. Repeated access to the column address can be done at high speed within the row. 256K RAMs are available from Intel with a row access cycle time in a range of 60–100 nanoseconds. In order to operate faster than a 60 nanoseconds cycle, two banks of chips may be interleaved. The instruction memory 11 is accessed by the instruction register 37 which, as will be seen, provides operation codes (OPCODES) to the pipeline processor (computer) 19.

Instructions loaded into the instruction memory 11 contain an opcode and data memory addresses. The opcodes are in the form of AND, OR, LOAD and STORE commands among others. The pipeline processor, i.e., computer 19 can be configured to execute these instructions in a pipeline format because once simulation starts, there are no branches in the instruction stream. The processor must be able to start a new instruction on a cycle but it may take several cycles, for example three, to complete each instruction. A state memory 21 is also provided and which is accessed by the pipeline processor 19 via a data address register 23. Data is written into the state memory 21 through a write data register 49. Data is read from the memory by a read data register 45.

The state memory 21 which is in the form of a static random access memory (SRAM) will contain at least 128,000 two bit words. The two bit data words are stored in the state memory 21 and each represents the logical value of a node in the logic being simulated. Table 1 below defines the format of the simulator data. These values are chosen to be compatible with the software simulator which will use general purpose computer instructions to simulate logic.

TABLE I

| Value | Symbol | Data |
| --- | --- | --- |
| Zero | 0 | 00 |

TABLE I-continued

| Value | Symbol | Data |
| --- | --- | --- |
| One | 1 | 11 |
| Unknown | X | 10 |
| High Impedance | Z | 01 |

Figures 2, 4:
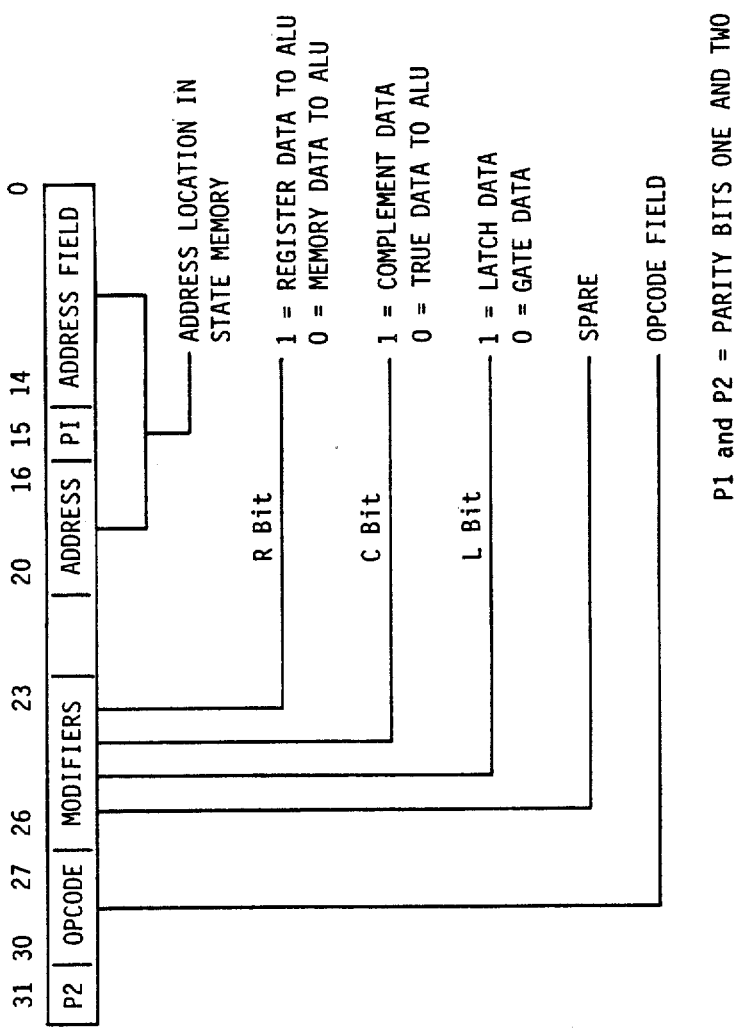
FIG. 2 is an illustration of the organization of the state memory of the preferred embodiment of the present invention.
FIG. 4 is an illustration of the instruction word format of the preferred embodiment of the present invention.

The state memory 21 is organized into N words each having two bits. As illustrated in FIG. 2 there are five categories of data stored in the state memory 21. The regions defined as "Input" and "Output" are the input/output terminals of the logic being simulated. The region labeled "Compare" is the expected simulation result for nodes that are to be checked on each simulation cycle. The "Nets" are the nets within the combinational logic being simulated. The region defind as "Latch" contains two words for each latch. One is used to store data in the master latch and the other for data in the slave. The master and slave data for each latch is stored in consecutive even and odd memory locations.

This state memory 21 can be written or read from by the host processor 17, at the end of each simulation cycle via the write and read data registers 49 and 45, respectively. To begin simulation, the host processor 17 must initialize this state memory 21 by loading logic values into the input region, the slave latch region, and the compare region. The nets and master latch regions are initialized to unknown "X" values.

In each simulation cycle the processor 19 executes instructions in the instruction memory 11 to operate on logic values from the "Input", slave "Latch" and "Nets" regions of the state memory 21. The results are stored in the "Nets", "Outputs" and master "latch" regions of the state memory 21. At the end of each simulation cycle, additional instructions in the instruction memory 11 are executed to compare expected values from the "compare" region with actual values produced by the simulation. If any Node does not compare, a status bit is turned on to signal the pipeline processor 19 as will be explained below.

For all latches operated by a nongated clock, a one bit base register is used to control the address of the master and slave. The first simulation cycle reads the slave latch data from odd locations and writes master latch data into even locations. Instead of moving the master latch data to the slave locations, a base register will be complemented at the end of each simulation cycle to change the defined location of the master and slave. In this regard, a control bit is needed in the instruction to the base register to distinguish latch data addresses so that the base register can be used to calculate the correct address.

If the latch has a gated clock, the memory location for the master and slave are fixed. At the end of the simulation cycle, data is transferred from the master to the slave only if the clock is enabled. This is accomplished by executing an opcode instruction from instruction memory 11 to load the logic value of the enable bit into a storage control register 51 which can bypass the ensuring store instructions. Two instructions are then exectued for each latch which is controlled by the enable bit. These are load from the master latch to the accumulator in the processor 19 and store from the accumulator to the slave latch data location. This storage control register 51 is then cleared by loading it with a one at the end of the latch simulation.

Figure 3:
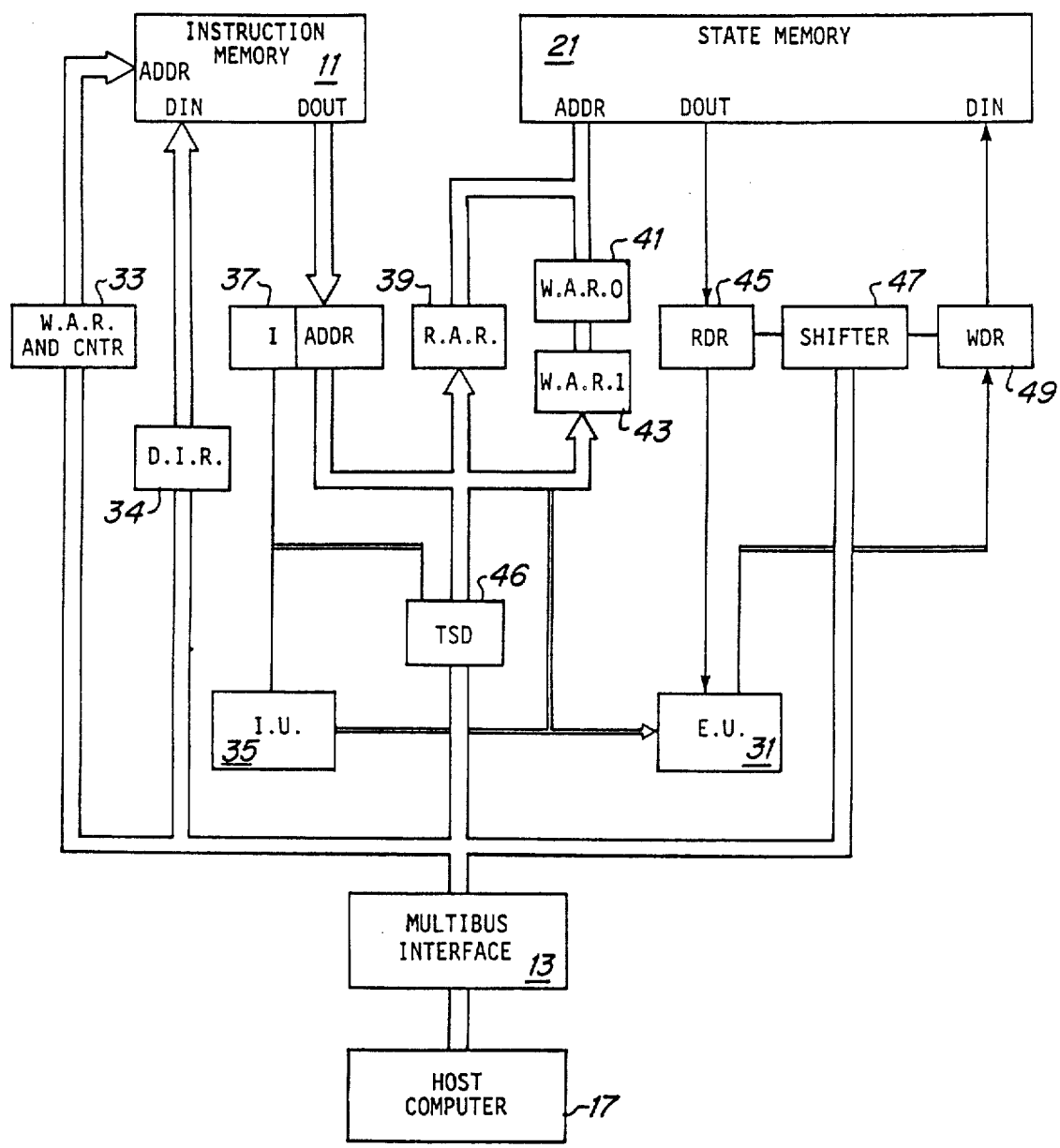
FIG. 3 is a more detailed functional block diagram of the preferred embodiment of the present invention.

Turn now to FIG. 3 which is a more detailed block diagram of the simulator of the present invention. With respect to FIG. 3, there are shown the two primary memories associated with the simulator. As aforementioned, the instruction memory 11 contains at least 256K 32 bit words. The output of this instruction memory 11 contains an opcode and modifier bits used by the pipeline processor 19 and an address field which is utilized for the state memory 21. Each instruction word includes, as illustrated in FIG. 4, a four bit opcode, three modifier bits and associated data memory address. The four bit opcode field allows for 16 different opcodes which are set forth below in table two. Most of these opcodes are executed by the arithmetic logic unit in the execution unit 31 which forms part of the pipeline processor 19 to perform logical operations on input data. Those opcodes which do not perform logical operations on input data are the load store control "LS", store "ST" and halt "HA" opcodes.

TABLE 2

| Op-code | Name | R | C | L | Function | Source | Destination |
|---|---|---|---|---|---|---|---|
| 0000 | NI | | | | No-Op | | |
| 0000 | NI | X | | | Toggle MSC | | |
| 0001 | LA | X | X | X | Load Acc | M,R | Acc |
| 0010 | AN | X | X | X | AND | M,R | Acc |
| 0011 | NA | X | X | X | NAND | M,R | Acc |
| 0100 | OR | X | X | X | OR | M,R | Acc |
| 0101 | NO | X | X | X | NOR | M,R | Acc |
| 0110 | XO | X | X | X | XOR | M,R | Acc |
| 0111 | XN | X | X | X | XNOR | M,R | Acc |
| 1000 | TR | X | X | X | Tri-state | M,R | Acc |
| 1001 | TX | X | X | X | Xmit-gate | M,R | Acc |
| 1010 | DO | X | X | X | CMOS Dot | M,R | Acc |
| 1011 | CO | X | X | X | Compare | M,R | Acc |
| 1100 | WD | X | X | X | Weak Dvr. | M,R | Acc |
| 1101 | LS | X | X | X | Load SCR | M,R | SCR |
| 1110 | ST | | | X | Store | Acc | Mem |
| 1110 | ST | X | | | Store Adr. | IR | WAR |
| 1111 | HA | | | | Halt | | |

The load/store control opcode LS loads data from the output of the true-complement block 61 in the execution unit 31 which will be explained more fully in connection with FIG. 5 into the store control register SCR 51 also in the execution unit 31. The store opcode ST stores the contents of the accumulator 55 into the state memory 21 if the store control register 51 contains a "one" and acts as a nonoperation code if the SCR contains a "zero". This allows for the simulation of latches with gated clocks. Near the end of the simulation cycle, after all the states have been calculated, the value of the clock gate state is loaded into the SCR 51 followed by load of the accumulator LA from the master and a store ST to the slave location for each latch controlled by this gate. If the gate output is a "0", the slave location retains the old data. The Compare "CO" instruction is used to compare the results of the simulation cycle with expected results stored in the state memory 21. After all state values have been calculated a string of LA and CO instructions are executed to load the expected value into the accumulator 55 and then compare the calculated state of the accumulator 55. If the state does not compare, the comparison counter 65 in the execution unit 31 is incremented and an interrupt is sent to the host processor 17 at the end of the simulation cycle.

As an interface to the memories 11 and 21 and the pipeline processor 19 are a series of registers. The memory address register 33 generates addresses for the instruction memory 11. The memory address register 33 can be loaded via multibus interface 13 or by the instruction unit 35 during a "halt" instruction. During simulation, the memory address register 33 will sequentially increment one location at a time.

An instruction register 37 contains a current instruction word fetched from the instruction memory 11. The operation code and modifier section bits of the 32 bit instruction word are decoded by the instruction unit 35 and the address field bits of the instruction word are loaded into either the read address register 39, the write address register 43 or the memory address register 33. It should be appreciated that the contents of the instruction register 37 can also be read by the multibus interface 13. The read address register 39 generates an address to the state memory 21 for data access. This register 39 as aforementioned, is loaded by the instruction register 37. The write access register "WARO" 41 contains the address of the state memory 21 into which will be placed the results of an operation performed by the execution unit 31. It is loaded by the output of the write address register "WAR 1" 43. The actual storage operation can occur several cycles after WAR 1 has been loaded.

The write address register 43 is loaded by the address field of the instruction register 37. This register is used as a buffer to hold the next write address for WARO 41. During multibus operations, the write address register 43 will increment one count for each operation.

The read data register 45 contains the two bit output of the state memory 21. During simulation, the data from the register 45 is used by the execution unit 31. The output of the read data register 45 can also be serially shifted into the shifter 47 in order to be read by the multibus interface 13. A write data register 49 holds the two bit result from the accumulator 55 in the execution unit 31 or it can receive two bits from the shifter 47. The data will be stored into the state memory 21 in the location specified by the write address register 41. The shifter 47 is a means by which the 16 bit multibus interface 13 can read or write into the two bit wide state memory 21. During a write operation, data is loaded in parallel from the multibus and then shifted two bits at a time into the write data register 49 where it is stored into the state memory 21. A read operation is done in the reverse order using the read data register 45 and the multibus interface 13 for reading the shifter 47 back 16 bits at a time. The shifter 47 also serves as the input/output port to the diagnostic serial scan ring to be explained below.

The instruction unit 35 decodes the opcode and modifier field portion of the output of the instruction register 37 during simulation. The instruction unit 35 controls data flow between the various system registers and memories and controls the operation of the execution unit 31. The execution unit 31 performs logical operations on data from the state memory 21 contained in the read data register 45 through an arithmetic logic unit 63 and accumulator 55. The results of these operations are returned to the write data register 49 for storage in the state memory 21. The execution unit 31 will be discussed more fully below.

The multibus interface 13 is of a common type known in the art and is defined by Intel Corporation. It contains all of the logic necessary to control the simulator by a host computer 17 via a multibus interface 13. It supports four levels of DMA and has the capability of controlling the multibus through the use of bus arbitration logic all of which is standard and known in the art.

The Tri-state drivers 46 allows the multibus interface 13 access to the high speed internal data path between the instruction register 37, the read address register 39 and the write address register 43. This is a by-directional path that enables the multibus interface 13 to read the instruction register 37 or write to the write address register 43.

The simulator is configured to include a scan ring which consists of a series of the registers that under test condition can be serially shifted in a ring configuration. The multibus interface 13 may read or write a 16 bit word into this ring and also cause the registers to transfer data in and out. This configuration allows parallel registers to be read or to be set by the multibus interface 13. With respect to FIG. 3, the scan ring is connected in the following sequence. The instruction memory address register 33 outputs to the instruction register 37 which in turn outputs to the read address register 39. The read address register 39 outputs to the write address register 41 and then to the read data register 45, the register 45 outputs to the shifter 47, to the write data register 49, and back to the memory address register 33.

Turn now to a more specific discussion of the operation of the instruction unit 35. The instruction unit 35 is used to decode the instructions and control the flow of data through the system. It will operate as a three stage pipeline in order to complete the execution of one instruction per simulator clock cycle. This means that it takes three clock cycles to complete the execution of each instruction. However, a new instruction can be started during each cycle.

The first stage of the three stage pipeline is used to decode the instruction from the instruction register 37 and load the state memory address into the read address register 39. The second cycle includes the access time of the state memory 21 resulting in data being loaded into the read data register 45. In the third cycle, the execution unit 31 calculates a new result from the input data and loads it into the accumulator 55 which forms part of the execution unit 31.

The STORE instruction cannot use the second cycle to store the previous result from the accumulator into the state memory 21 because it is still being calculated. Accordingly, the second cycle occurs at the same time as the third cycle of the previous instruction. However, the second cycle is not wasted because it is used to store the results of the previous STORE instruction into the state memory 21. On the third cycle of the present store instruction, the contents of the accumulator 55 and the store state memory address are loaded into the write data register 49 and the write address register 43. This operation will become more fully apparent below where a specific example is discussed.

Refer now back to TABLE 2 which is a list of the various opcodes coupled to the instruction unit 35. In most cases the four bit opcode from the instruction register 37 is passed along to the execution unit 31 and as will be discussed below in connection with discussion of the execution unit 31. The load store control opcode (LS) causes the value of the true-complement circuit output to be loaded into the store control register 51 in FIG. 5. The purpose of the store control register 51 is to qualify store commands. The store control register 51 can cause three different operations of the store command which is opcode ST in Table two. A zero will cause the store command ST to be ignored. A one will allow the store command to store the data normally. A unknown or high impedance will cause the storage of an unknown regardless of the data. The load store opcode LS allows gated clocks to be simulated.

Figure 5:
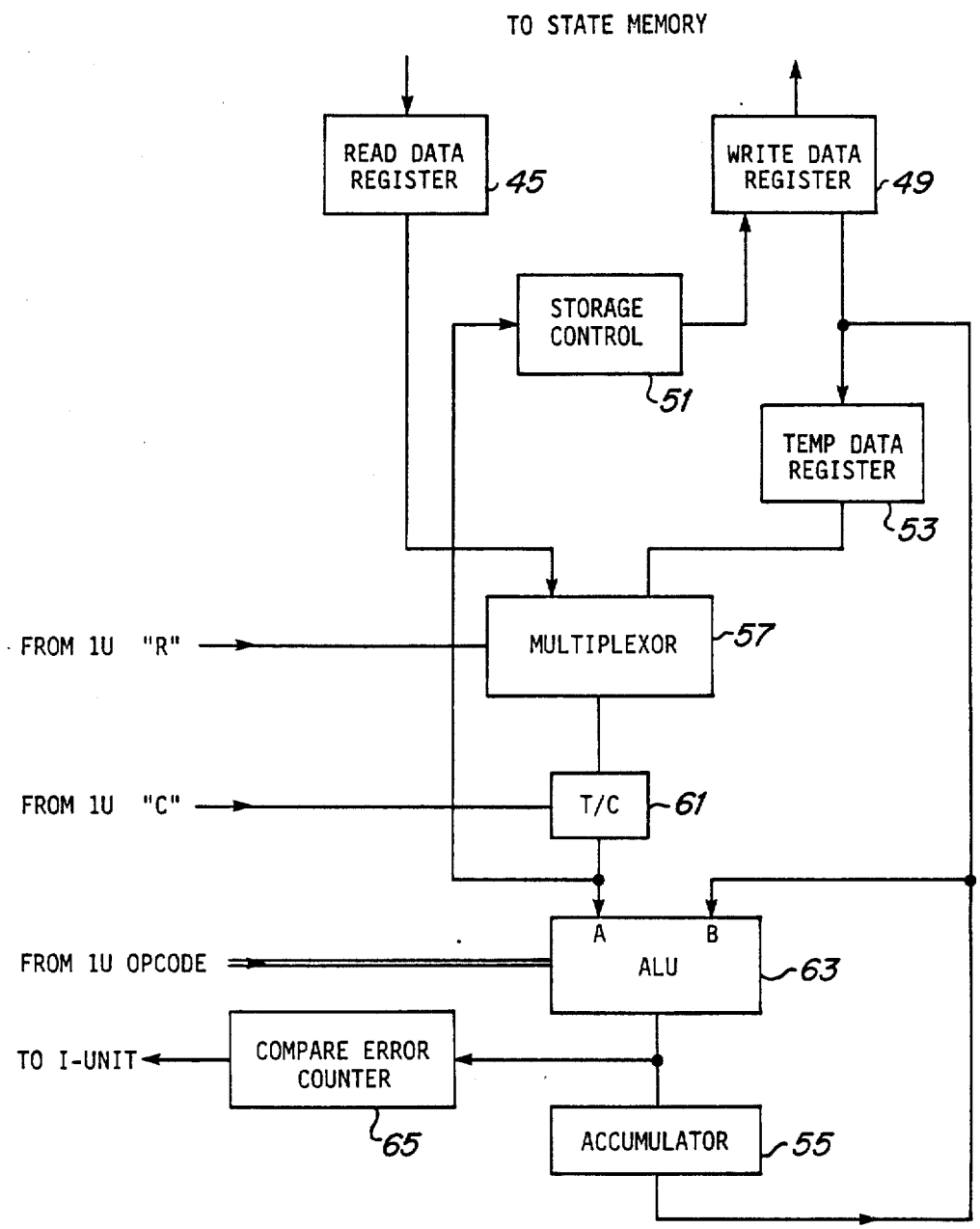
FIG. 5 is a block diagram of the execution unit of the preferred embodiment of the present invention.

The store command ST causes the contents of the accumulator 55 to be clocked into the write data register 49 of FIG. 5 providing that the store control is true.

The opcode halt instruction (HA) performs a number of functions. When decoded by the instruction unit 35 the following sequence of events will occur.
1. The instruction fetch cycle will stop;
2. The pipeline will complete operation; and
3. The memory address register 33 will be loaded with the address contained in the instruction register 37.
4. As simulation complete interrupt will be generated, and
5. If the R modifier bit is on and the accumulator is equal to a "one", the simulation will restart and a simulation complete interrupt will not be issued.

The no instruction opcode (NI) with the "R" bit modifier on, will cause the master-slave control latch in the instruction unit to toggle to its opposite state. This will normally be done just before the compare instructions.

Of the three modifier bits, two are passed directly to the execution unit 31. They are the "R" bit which is coupled to the multiplexer 57 in the execution unit 31 to select either the output of a temporary data register 53 or the read data register 45. The other modifier bit to pass directly to the execution unit 31 is the "C" bit which is applied to the true-complement gate 61. The third modifier is the "L" bit which is used for "D" type flip-flop simulation. By way of explanation, all system clocked latches are initially stored in the state memory 21 with the master side at an even address followed immediately by its slave section. The master slave control flip-flop is initialized to zero. If a store command has the L bit on, then an OR is done with the master slave control flip-flop and the least significant bit of the state memory address 21. Any read operation with an L bit will cause a NOR of the master slave control flip-flop and the least significant bit of the memory address. Upon receipt of a non-op opcode (NI) and an R modifier instruction, the master slave control flip-flop is clocked, thus, exchanging the master and slave sections of all the clocked latches.

Turn now to FIG. 5 for a more detailed discussion of the execution unit. The execution unit includes a storage control register 51 which is used to determine if data is to be written into the state memory 21 by the ST opcode as described previously in connection with the instruction unit 35 description. A temporary data register 53 allows intermediate simulation results to be stored and operated on. Without this register 53 these results would require store and load commands to be directed to the state memory 21. This register is loaded with the previous contents of the accumulator 55 when the load accumulator opcode LA is executed. The multiplexer 57 selects either data from the read data register 45 or the temporary register 53 dependent upon the state of the R modifier bit from the instruction unit 35. A true-complement circuit 61 either passes the output of the multiplexer 57 or complements its input dependent upon the state of the C modifier bit from the instruction unit 35. The arithmetic logic unit 63 performs logical operations upon the input data coupled thereto. The arithmetic logic unit 63 receives control and opcode values from the instruction unit 35, performs operations on the data from the accumulator 55 and puts the result back into the accumulator 55. This arithmetic logic unit operates on two operands of two bits each to produce a two bit result. The logic unit utilizes four bits of opcodes and four bits of operands that result in the two bit value. This function can be implemented by using a high speed PROM. If a PROM is used, the opcodes can easily be changed or new opcodes can be added. The table of FIG. 6 is a truth table for the arithmetic logic unit 63.

Within the execution unit 31 of FIG. 5 in the arithmetic logic unit 63 as indicated by the truth table of FIG. 6, a number of instructions are implemented. The AND instruction causes a logical AND of input A and B to be performed and the result is read out of the accumulator 55. The NAND instruction causes a logical NAND of the inputs A and B to be performed and the output is coupled to the accumulator 55. In similar fashion the OR instruction, NOR instruction, exclusive OR instruction (XOR) and exclusive NOR (XNOR) each causes the well-known logical function to be implemented with the output coupled to the accumulator 55. The tri-state instruction TRI simulates a noninverting tri-state buffer with a positive true control line. The accumulator 55 must hold the value of the data input to the buffer and input A is the control line. The result is placed in the accumulator 55. The TX instruction simulates a transmission gate with a positive true control line. The accumulator 55 must hold the input to the transmission gate and input A is the value of the control line. The result again is placed in the accumulator 55. The DOT instruction simulates a CMOS dot. Inputs A and B are the two inputs to the dot and the result will remain in the accumulator 55. The LA or load accumulator instruction will transfer input A through the arithmetic logic unit 63 to the accumulator 55 without modification. The compare instruction CO will cause the accumulator 55 to hold the expected value while the input A is the value to be checked. The result of the comparison will be left in the accumulator 55. If the expected value is "X", it is treated as a do not care result and no error signal will be generated. Finally the weak driver "WD" instruction causes the accumulator 55 to hold the net value and the input A is set to equal the weak driver value. The result will be left in the accumulator 55. The execution unit 31 also includes a compare error counter 65 which totals the number of noncompares that may result from the compare instructions. If that total exceeds the capacity of the counter, an overflow latch will be set causing the overflow status bit to be set. The contents of the compare error counter 65 can be read by the multibus interface 13.

Figure 7:
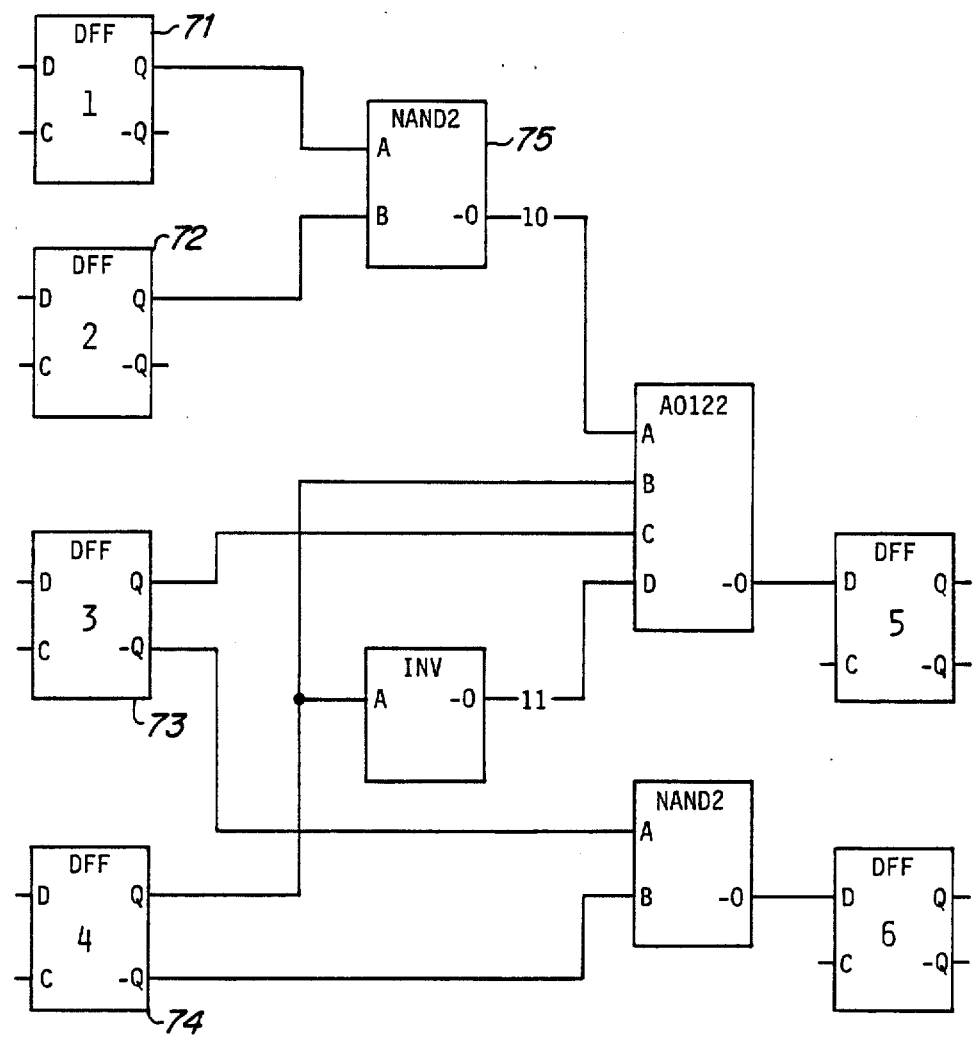
FIG. 7 is an illustration of a example of a simulated logic system.

Turn now to FIG. 7 which is an example of a simulation operation in accordance with the present invention. A small sample logic system is illustrated which represents a data path in an edge triggered clock driven synchronous system. The left edge of the logic diagram contain four D-flip-flops (DFFs) 71-74 that represent data to the combination of logic elements when a clock occurs. This data flows through the logic producing new inputs to the two DFFs on the right edge of the diagram. The next clock pulse transfers the input data which is in the master latch to the slave latch within the DFF which drives the outputs in the next block of the logic system. Below in Table 3 is a listing of the instructions in a simulation program in accordance with the present invention which will simulate the logic of FIG. 7. This program assumes that the host computer 17 or previous logic has loaded data into the four latches 71-74. It also assumes that the host computer 17 will read the value of the output latches and compare them to the expected value.

TABLE 3

| Inst. | Address | Description |
|---|---|---|
| LA,L | 1 | load ACC with DFF 1 |
| NA,L | 2 | NAND ACC with DFF 2 |
| AN,L | 4 | AND ACC with DFF 4 |
| LA,L | 3 | Load ACC with DFF 3 |
| AN,L,C | 4 | AND ACC with comp. of DFF 4 |
| NO,R |  | NOR ACC with REG |
| ST,L | 5 | Store ACC to DFF 5 |
| LA,L,C | 3 | load ACC with comp. of DFF 3 |
| NA,L,C | 4 | NAND ACC with comp. of DFF 4 |
| ST,L | 6 | Store ACC to DFF 6 |
| HA |  | Halt |

Simulation begins by evaluating the NAND gate 75 with the first two instructions and leaving the result in the accumulator 55. Since the NAND gate 75 has only one load it is not necessary to store the result in the state memory 21. The first AND in the A0122 R register is evaluated by the third instruction of Table 3 also leaving the result in the accumulator 55. When the fourth instruction loads a new value into the accumulator 55, the old content of the accumulator 55 is transferred to the temporary data register 53. The fifth instruction obtains a compliment of the data in gate 4 so as to eliminate evaluation of the inverter. This fifth instruction evaluates the second AND in the A0122 register. The sixth instruction performs the NOR of the contents of the register with a contents of the accumulator 55 which is the second AND in the A0122. The following store instruction puts the result into the address on the master latch at address 5.

Simulation continues by loading data into the accumulator 55, performing the NAND with the contents of address 3 and storing the result into the master latch at address 6. The halt instruction interrupts the host processor 17 to evaluate the results. By this process a logic level simulation is performed as opposed to an event driven simulation.

As set forth below in Table 4, the flow of instructions through the processor in pipeline fashion as mentioned above is illustrated. In the Table time is shown along the horizontal row and is represented by clock cycles. The three stages of the pipeline are the instruction decode, fetch data and execute stages. The line showing the pipe out contains a "one" if the write data register 49 contains data ready to be stored in the state memory 21.

TABLE 4

| Cycle | 1 | 2 | 3 | 4 | 5 | 6 | 7 | 8 | 9 | 10 | 11 | 12 | 13 |
|---|---|---|---|---|---|---|---|---|---|---|---|---|---|
| Inst. Decode | LA | NA | AN | LA | AN | NO | ST | LA | NA | ST | HA |  |  |
| Fetch Data |  | LA | NA | AN | LA | AN | — | — | LA | NA | — | HA | — |
| Execute |  |  | LA | NA | AN | LA | AN | NO | ST | LA | NA | ST | HA |
| Pipe Out | 0 | 0 | 0 | 0 | 0 | 0 | 0 | 0 | 1 | 1 | 0 | 1 | 0 |

Each instruction uses one cycle in the instruction unit 35 to be decoded. On the second cycle, a new instruction is being decoded while data is being fetched from the state memory 21 for the first instruction. The third cycle is for decoding the third instruction, fetching data for the second, and executing the first instruction. This operation proceeds through cycle 8 where the accumulator 55 contains the output of the A0122 to be stored into the state memory 21. The "—" in the fetch data position for cycles 7, 8, 11 and 13 indicates that a data fetch for the state memory 21 is not needed. If data is waiting in the write data register 49 for storage in the state memory 21, the processor uses the unused fetch cycle to write into the state memory 21 as in cycle 11. The store instruction in cycle 12 loads the write data register 49 with new data which is written into the state memory 21 in the unused fetch cycle 13. Two store instructions are not allowed in sequence because the output of the pipe has only one data register to hold the write data and the data for the second store would be loaded into the write data register 49 in place of the first. Thus illustrated in Table 4 is the three cycle pipeline process of the present invention.

It should be appreciated that more than one such simulator can be connected in parallel to perform simulation for large scale systems having up to a million gates or more. It should also be appreciated that, in keeping with the present invention, the simulator will use levelized instructions that will simulate one clock cycle of the logic design with one pass through of the instruction. Accordingly, less than two instructions will, of course, be required to simulate each gate. The execution time of the simulator will be determined by the static RAM cycle time. The simulator time accordingly is 100 ns which will give a simulation rate of between 5 million to 7 million gates per second.

While the present invention has been disclosed in connection with a preferred embodied thereof it should be appreciated that there may be other embodiments of the present invention which fall within the spirit and scope thereof as defined by the appended claims.

What is claimed is:

1. A logic simulation for logic elements to be evaluated in logic levels, the system comprising:
    a state memory means having data input and data output ports for storing at addressable locations therein only the states of the logic of said logic system, and for cycling for access at the data output port the subsequent output states of logic elements evaluated;
    logic means for performing selectable logic functions on a pair of signals applied to data input ports thereof and having an output electrically coupled to an accumulator which accumulates the resultant logic function therein;
    means coupling the output of the accumulator to an input of the logic means and to the data input port of the state memory means;
    means coupling the data output port of the state memory means to another input of the logic means for supplying thereto the states of logic elements stored at selected addressable locations therein;
    an instruction memory means for receiving and storing therein instructions corresponding to each logic element in each level of the logic in said logic system as a model of a logic system to be simulated and for supplying the stored instructions in read-only succession; and
    instruction means coupled to receive the instructions in said instruction memory means in a level by level sequence for supplying therefrom addresses of the stored states of corresponding ones of the logic elements sequentially in the state memory means, and for supplying to the logic means operating codes for controlling the logic function thereof and the transfer of a logic state in the accumulator to the date input port of the state memory means.

2. A logic simulation system as in claim 1 comprising:
    a data register connected to the output of said accumulator; and
    a multiplexer connected between the output of said data register and one of the data input ports of the logic means
    said data register and multiplexer being selectably operable to supply data from said data register or from said data output port of the state memory means as input data to one port of said logic means.

3. A logic simulation system as in claim 2 wherein said instruction means supplies to the multiplexer a control code for selectively supplying data to the logic means from said data register instead of from the state memory means.

4. A logic simulation system as in claim 1 comprising:
    a true or complement circuit connected to one data input port of the logic means for supplying thereto true data or the complement thereof in response to an applied control code, and
    said instruction means supplies to the true or complement circuit a control code for selectively loading the logic means with true or complemented data supplied thereto.

5. A logic simulation system as in claim 1 wherein the instruction stored in said instruction memory means contains one control code and one address such that said instruction when executed on the data from said accumulator and from the addressed location in said state memory means simulates the operation at one connection of a logic element at one level in the simulated logic.

6. A logic simulation system as in claim 1 wherein an expected output logic state of the logic being simulated can be stored in one addressable location in said state memory means and the actual output logic state of the logic being simulated can be stored in another addressable location in said state memory means; wherein said logic means loads said accumulator with the expected logic state from an addressable location in said state memory means; and comprising:
    comparator means responsive to a compare instruction for comparing an expected output logic state in the accumulator with the actual output logic state from an addressable location in said state memory means, and for storing the result of the comparison in the accumulator; and
    means for storing the occurrence of a compare error during a logic simulation.

7. In a logic simulation system including instruction memory means for storing therein instructions corresponding to each logic element in each level of the logic in a logic system wherein the logic elements of the simulated logic system include master and slave sections of a latch, and the states of the master and slave sections of each latch are stored in successive even and odd address locations that can be read from and written to in state memory means, and comprising:
    a one-bit base register for containing the value that defines which of said successive even and odd locations in state memory means contains the master latch state and which contains the slave latch state; and means coupled to the state memory means and responsive to the value in the base register and to an applied control code from an instruction for altering the least significant bit of the address supplied to the state memory means to provide the latch slave state locations for all reads from the state memory means and to provide the latch master state locations for all writes to the state memory means.

8. In a logic simulation system wherein the logic elements of the simulated logic system include master and slave sections of a latch, the states of the master and slave section of each latch are stored in two locations that can be read from and written to in a state memory, and a simulated clock signal into such latch is gated by the state of a clock enable signal, and comprising:
 a two-bit storage control register which can be loaded with the states of the clock enable signal as logical 1, logical 0, unknown, and high impedance states; and
 means responsive to the contents of said storage control register to control the write into state memory such that no write takes place if the contents of said storage control register is a zero, the write takes place with the correct data if the contents of said storage control register is a one, and the write takes place with data of unknown value if the contents of said storage control register is the unknown or high impedance states.

9. The method of simulating a logic system comprising the steps of:
 storing at addressable locations the states of the logic elements in each level of logic of said logic system, the stored states being cycled for access as subsequent output states of logic elements evaluated;
 performing selectable logic functions on a pair of applied signals and accumulating the resultant of such logic functions;
 supplying the accumulated resultant as one of said pair of applied signals;
 storing the accumulated resultant as a logic state that is storable at an addressable location;
 supplying stored output states that are cycled for access as another of said pair of applied signals;
 storing instructions corresponding to each logic element in each level of the logic in said logic system, and expected outputs from logic functions performed on each such logic element as a model of a logic system to be simulated; and
 receiving the stored instructions in a level by level sequence for supplying therefrom addresses of the stored logic states of corresponding ones of the logic elements sequentially, and for controlling said logic function and the transfer of an accumulated logic state to an addressable location.

10. The method as in claim 9 comprising the steps of:
 selectively storing the accumulated resultant of said logic function; and
 selectively bypassing the access to a state from said addressable location for accessing the stored accumulated resultant.

11. The method according to claim 10 wherein the step of selectively bypassing for accessing the stored accumulated resultant is in response to a stored instruction.

12. The method according to claim 9 comprising the steps of:
 selectably supplying as said another of the pair of applied signals for the logic function the true data or the complement thereof in response to an applied control code; and
 supplying from stored instructions the control code for selectively supplying true or complemented data for the logic function.

13. The method according to claim 9 wherein the logic elements of the simulated logic system include master and slave sections of a latch, and the states of the master and slave sections of each latch are stored in successive even and odd addressable locations, the method comprising the steps of:
 storing a one bit value that defines which of said successive even and odd addressable locations contains the master latch state and which contains the slave latch state; and
 in response to a control code from said instruction, using said one bit value to alter the least significant bit of the address of the addressable storage locations to provide the latch slave state location for all reads from the addressable locations, and to provide the latch master state location for all writes to said addressable locations.

14. The method according to claim 9 wherein the logic elements of the simulated logic system include master and slave sections of a latch, the states of the master and slave sections of each latch are stored in two addressable locations, and a simulated clock signal into such latch is gated by the state of a clock enable signal, and comprising the steps of:
 establishing a two bit storage control value including logical 1, logical 0, unknown, and high impedance values as the states of said enable signal; and
 controlling the write into said addressable locations in response to said storage control value such that no write occurs if the storage control value is a zero, the write occurs with correct data if the storage control value is a one, and the write occurs with data of unknown value if the storage control value is a value of unknown or high impedance.

* * * * *